April 16, 1935.  O. F. MUNGUET  1,998,165
APPARATUS FOR SUBMARINE EXPLORATION AT GREAT DEPTHS
Filed Dec. 4, 1934  2 Sheets-Sheet 1
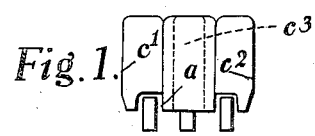
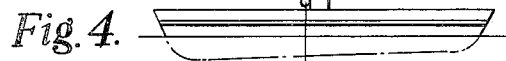
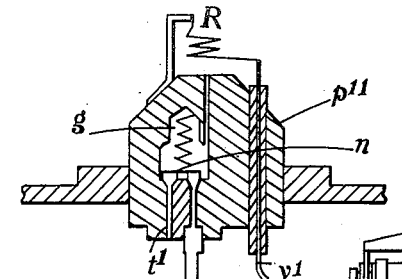
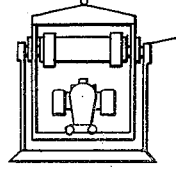
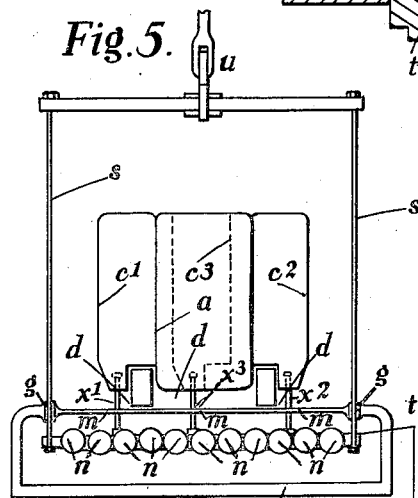
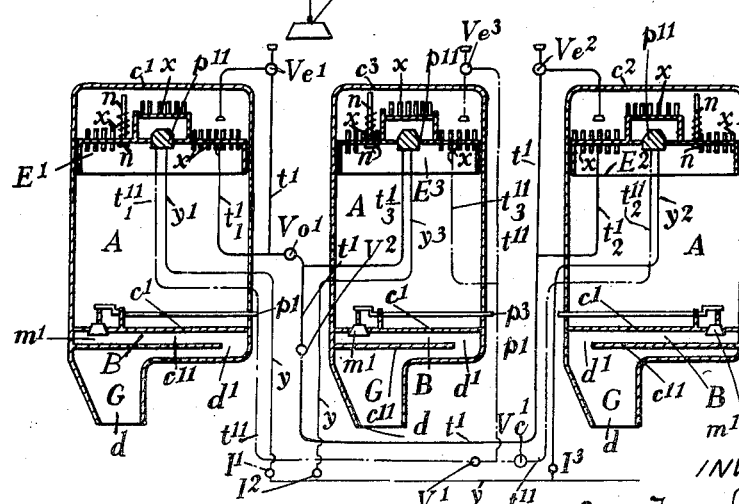
INVENTOR
Oscar Ferrer Munguet
BY
L. Donal
ATTORNEY April 16, 1935.  O. F. MUNGUET  1,998,165

APPARATUS FOR SUBMARINE EXPLORATION AT GREAT DEPTHS

Filed Dec. 4, 1934  2 Sheets-Sheet 2

INVENTOR
Oscar Ferrer Munguet
BY
S. Loral.
ATTORNEY

Patented Apr. 16, 1935

1,998,165

UNITED STATES PATENT OFFICE 1,998,165

APPARATUS FOR SUBMARINE EXPLORATION AT GREAT DEPTHS

Oscar Ferrer Munguet, Barcelona, Spain

Application December 4, 1934, Serial No. 755,942
In Spain September 13, 1934

10 Claims. (Cl. 61—69)

Application has been filed in Spain September 13, 1934.

The present invention relates to apparatus for submarine exploration and work at great depths of the kind forming the subject matter of my French Patent No. 759,197.

As a result of investigations carried out in connection with the said apparatus, it was found possible to make very considerable improvements therein, chiefly as regards the arrangement and the working of the floats utilized which constitute the really essential part of the said apparatus. When an apparatus is used which is properly calculated for resisting the pressures to which it is to be exposed and the weight of which is greater than the thrust of the water which it displaces at the depth which it is desired to reach, the apparatus will remain on the bottom after having descended on a platform. If the bells or float tanks with which the apparatus is provided and which during the descent are in communication with the water, displace outside a volume of liquid equal in weight to the negative buoyancy which is to be overcome, then, if volumes of air or some other gas are injected under pressure into them, the negative buoyancy of the apparatus will be decreased by the displacement of the same volumes of water from the interior of the said bells, until the moment at which the thrust of the displaced liquid exceeds the weight of the apparatus so that the latter will rise to the surface.

The compressed air or gas required for filling the bells at the same pressure as that of the surrounding water, does not, however, represent a practical solution when it is a question of depths exceeding some 200 metres, since in that case it would be necessary to use large quantities at very high pressures, and the tanks for containing them would be of such an excessive weight as to render their use impracticable This is avoided only by injecting into the bells or float tanks a volume of air or gas compressed to the same pressure as that of the outside water, whereby the negative buoyancy of the apparatus is for the most part destroyed in order that it should acquire lightness for travelling on the bottom or floating between two waters.

And in order to cause the apparatus to ascend or rise, the volume of the air or gas injected is expanded by means of heat, the water being displaced from the bells, whereby the positive buoyancy is increased until the negative buoyancy is cancelled, whereupon the apparatus rises to the surface of the water, the excess of the compressed air escaping during the ascent as the pressure of the water decreases.

In order to make the improvements forming the subject matter of the present invention clearly understood, a preferred constructional form of apparatus according to the invention and its mode of operation will now be described by way of example with reference to the accompanying drawings which show an apparatus of the kind set forth in the aforesaid French patent provided with a new and improved arrangement of the floats and the heating system.

In this case, the fuel used is gas such as hydrogen, lighting gas etc. or any other gas or combustible mixture of gases. For the purposes of this description it will be assumed that the combustible gas used is hydrogen.

Fig. 1 is a diagrammatical elevational view of the float tanks of the device.

Fig. 2 is an elevation of a complete device being lowered from the "mother" ship to the bottom of the sea.

Fig. 3 is a cross sectional view through the tanks shown in Fig. 1, but with the tanks moved so that they can all be seen.

Fig. 4 is an enlarged cross sectional view of one of the gas burners $p''$ of Fig. 3.

Fig. 5 is a slightly modified form of the apparatus shown in the lower portion of Fig. 2.

Figure 6:
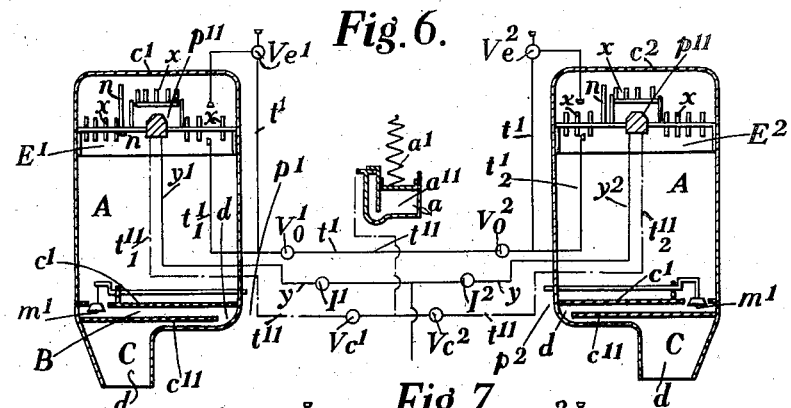
Fig. 6 is a modification of the apparatus shown in Fig. 3, adapted to use liquid, instead of gaseous, fuel from tank $a$.

The general arrangement of the apparatus is as follows: Figures 1 and 2 show it diagrammatically: $a$ is the strong shell and $c1$, $c2$, $c3$ the float tanks. They may be provided in any desired number, but for the purposes of this description, I will refer only to three. The construction of these tanks is exactly the same in all of them. The tanks $c1$ and $c2$ utilized as air or oxygen tanks are of exactly the same size, and the tank $c3$ used as a container for the combustible gas, is smaller.

Figure 3 shows the arrangement and general construction of the said tanks $c^1$ and $c^2$ for air or oxygen and of the tank $c^3$ for the combustible gas, with their respective control members:

(a) electric switches $I^1$, $I^2$, $I^3$ for lighting the burners $p''$, $p''$, $p''$ in the interior of $c^1$, $c^2$, $c^3$.

(b) valves $V_c^1$ $V_c^2$ for the control and transfer of the combustible gases.

(c) valves $V_o^1$ $V_o^2$ for the control and transfer of the air or oxygen.

(d) valves $V_e^1$ $V_e^2$ $V_e^3$ for the discharge of the gases outside and for intercommunication.

(e) control levers $p^1$, $p^2$, $p^3$ which enable the valves $m'$ $m'$ $m'$ to be closed.

All these above mentioned control members $I^1$, $I^2$, $I^3$, $V_c^1$ $V_c^2$, $V_o^1$ $V_o^2$, $V_e^1$ $V_e^2$ $V_e^3$ and $p^1$ $p^2$ and $p^3$ whenever herein referred to are to be understood to be capable of being actuated from the interior of the strong shell $a$, Figure 1, by the diver or divers in its interior.

The float tanks $c^1$ $c^2$ $c^3$ are subdivided into three compartments A, B and C by means of partitions or metal plates $c'$ and $c''$ in such a manner that the gas enclosed in the compartment A should pass into the compartment B from which it is separated by $c'$, through the valve $m'$. The compartment B communicates with the compartment C through the passage $d'$ and thence with the outside through the opening $d$.

This arrangement of the partitions $c'$ and $c''$ in the interior of $c^1$ $c^2$ and $c^3$ prevents the gases from escaping in the event of an excessively violent or pronounced lurching or inclination of the apparatus.

The compartments A A A in the three float tanks $c^1$ $c^2$ $c^3$ are divided in the same way into two parts by the pistons $E^1$ $E^2$ $E^3$ which can travel along the walls of the respective float tanks $c^1$ $c^2$ $c^3$ whilst making tight joints therewith. The said pistons, which are of light construction, are provided with ribs $x$ $x$ $x$ etc. for the purpose of facilitating radiation of the heat emitted by the device and generated by the burners $p''$ $p''$ etc. which they carry with them and the flame of which acts in this case on the upper part of the pistons $E^1$ $E^2$ $E^3$.

In the same figure, the pipes $t'$ $t'$ are used for the circulation of the air or oxygen, and the pipes $t''$ $t''$ for the circulation of the combustible gas. The electric ignition cable is indicated by $y$. The portions of the pipes and cables in the interior of the compartments A A A, which are connected to the corresponding burners in the pistons $E^1$ $E^2$ $E^3$, that is to say $t_1''$ $t_2''$ $t_3''$ and $y^1$ $y^2$ $y^3$ are flexible for the purpose of following the pistons in question in their travel in the corresponding compartment. As regards the corresponding connections and pipes or cables outside, it is immaterial whether they are rigid or flexible. Figure 4 shows in vertical section the burners for the gas fuel, used for the heating.

The flexible tube portions or sections in the interior of A adjoining the pistons $E^1$ $E^2$ $E^3$ and marked $t_1'$ $t_3''$ $t_2'$, are intended to feed the respective systems of pipes $t'$ and $t''$ with oxygen or fuel respectively, according as the valves $V_o^1$ $V_o^2$ are actuated for the former case or $V_e^1$ $V_e^2$ for the second case.

The method of operating is as follows. The apparatus, Figure 1, is lowered to the depth fixed, by means of platforms similar to those described in the aforesaid French patent with the improvements described further on, whilst the tanks $c^1$ $c^2$ are being filled with air or oxygen, and the third float tank $c^3$, Figure 3, is filled with the gas fuel.

As soon as the apparatus, Figure 1, is at the depth fixed, the gases will pass through C C C in the tanks $c^1$ $c^2$ $c^3$, Figure 3, and pass into the compartments B B B and to the bottom face of the pistons $E^1$ $E^2$ $E^3$ in the compartments A A A, displacing by gravity the water in their interior, the valves $m'$ $m'$ $m'$ remaining open. The volume of water displaced by the interior of the pistons $E^1$ $E^2$ $E^3$ which with the flexible tubes and cables attached to them, are of smaller weight, will cause them to rise since as the valves $V_e^1$ $V_e^2$ $V_e^3$ are open from the first moment at which the descent of the apparatus to the desired depth begins, whilst the system of pipes $t'$ and $t''$ is nevertheless kept closed, they will connect the upper part of A A A above the pistons to the outside water, so that the said pistons, on being raised by the thrust of the gas, will necessarily displace the water from above the same through the valves $V_e^1$ $V_e^2$ $V_e^3$ and on the said pistons reaching the upper part and their valve rod $n$ striking the upper part or roof of $c^1$ $c^2$ $c^3$ the gases will be able to flow there, the said valve $n$ $n$ $n$ on the upper part of the pistons being automatically opened, and as soon as all the tanks are filled, the first escapes will start through the valves $V_e^1$ $V_e^2$ $V_e^3$ at which moment, which indicates that the tanks are full, the diver will close the said valves. At that moment the tanks $c^1$ $c^2$ will be full of air or oxygen, and the tank $c^3$ full of gas fuel.

On the valves $V^1_e$ $V^2_e$ $V^3_e$ being closed and the upper part above the pistons being full of gas, the pistons under the action of their own weight will tend to return and thus on the pressure being relieved the valves $n$ $n$ $n$ will be closed automatically by means of their spring and therefore the upper part of the piston will again become independent from their bottom part within the compartment A A A.

The apparatus $a$, Figure 1, which in its light position will leave the platform by means of which it has been lowered, with its tanks filled, will render it possible to carry out the exploration and work in that position independent of the original weight of the strong shell.

In order to enable the apparatus to rise again to the surface, it is necessary that the gases in the interior of the tanks $c^1$ $c^2$ $c^3$, which the diver or divers until that moment partly filled by means of the tanks of the platform operating by means of the valves $V_e^1$ $V_e^2$ $V_e^3$ and $V_o^1$ $V_o^2$ and $V_c^1$ $V_c^2$, should be caused to expand by means of heat until they are further filled.

It has been stated that the heating of the gases is effected by means of the burners $p''$ $p''$ $p''$, Figure 3. As already mentioned, Figure 4 shows these burners in section, in which $p''$ is the principal body, $t_1''$ the pipe through which flows the gas fuel which by pressing against the spring and opening its valve, opens also the valve corresponding to the tube $t$ in communication with the air or oxygen contained in the compartment A under the piston. It must be pointed out that when the gas fuel and oxygen become mixed at $n$ and come in contact with the incandescent electrical resistance R fed by means of the electrical cable $y'$, flame will be produced. This mixture will necessarily come out under pressure with reference to the gas above the pistons, inasmuch as the gas in the bottom part has to support the weight of the said pistons producing an over-pressure.

Consequently with the switches $I^1$ $I^2$ $I^3$ switched on, the flame will be produced in the tanks $c^1$ $c^2$, Figure 3, the valves $V_c^1$ $V_c^2$ being kept open and the fuel being taken through the pipe $t''$ of the tank $c^3$. In the same way, a flame will be produced in the tank $c^3$ by keeping the valves $V_o^1$ $V_o^2$ open, and taking oxygen through the pipes $t_1'$ $t_2'$ of the tanks $c^1$ $c^2$, and the burner within the tank $c^3$ will be working so that (Figure 4) the pipe $t_1''$ will receive oxygen and through the pipe $t$ the fuel.

The apparatus with the gas already expanded, will rise with great expulsions of the same through the water right up to the surface.

The descent to the bottom and the filling of the float tanks takes place as follows: The apparatus, Figure 5, will be lowered to the fixed depth by placing it on the platform $n$ which forms a single body as regards the platform $p$. The whole apparatus is adapted to slide by means of the sleeves $q$ $q$ on the arms $s$ $s$ from which are suspended a series of tanks $n$ $n$ $n$ etc. in which the air or oxygen and the gas fuel are stored separately, and which are arranged side by side, and above which during the descent the platform $m$ and its load rests. At the other end of the arms $s$ $s$ a hook $u$ is provided to which a cable is attached, by means of which the apparatus $a$ together with its platforms is lowered to the bottom. The apparatus $a$ is located above the platform $n$ so that the pipes $x^1$ $x^2$ $x^3$ for the discharge of the gases, connected to the tanks $n$ $n$ $n$ etc. and passing loosely through the said platform $m$ pass exactly into the float tanks of the apparatus through the openings $d$ $d$ $d$, Figures 3 and 5. The pipes $x^1$ and $x^2$ discharge the air or oxygen, whilst the pipe $x^3$ discharges the fuel gas.

As soon as the weight $y$, Figure 5, touches the bottom of the sea before the apparatus proper touches the bottom, the lever $z$ being relieved, will rise under the action of a spring and open the valves which will allow the gases enclosed in $n$ $n$ $n$ etc. to fill the float tanks of the apparatus through the respective discharge pipes, so that the water will be expelled from the tanks.

On the platform $p$ touching the bottom, and the arms $s$ $s$ and tanks $n$ $n$ $n$ etc. continuing to descend, and with them the pipes $x^1$ $x^2$ $x^3$ and the whole resting on the platform $p$, the apparatus $a$ will become free and able to leave the platform $m$, gaining height between the said platform and the ground, by means of an inclined plane or bridge which is not shown in the drawings. If the said apparatus is provided with a propeller and vertical and horizontal rudders, it will be perfectly able to leave the said platform without having to touch the bottom, the apparatus being first lightened sufficiently to ensure its rising over the upper end of the discharge pipes $x^1$ $x^2$ $x^3$, whereupon by starting the propeller, it will leave the place or position at which the said platforms are located and can thus navigate between two waters.

The same arrangement of the apparatus may be used when liquid fuel is employed, in which case the float tank $c^3$ for the fuel gas, Figure 3, is done away with and replaced by a small fuel tank $a$, Figure 6, with the same type of apparatus as in Figures 1 and 2. The float tanks $c^1$ $c^3$ for the air or oxygen will have to be then slightly larger as there will not be available the floating force of the tank $c^3$, Figure 3, which has been eliminated. In Figure 6, the same letters indicate the same parts as in Figure 3, the working being exactly identical with that already described for the said figure. Now, on the valves $V_c^1$ $V_c^2$ being opened, the liquid fuel used, Figure 6, will pass either under the action of gravity or pressure of the spring $a'$ which works through the piston $a''$, through the burners $p''$ $p''$, mixed with the oxygen or air utilized for filling $c^1$ and $c^2$, and will be ignited, in the same way as explained for the preceding case.

In case it is desired to utilize in the tanks $c^1$ and $c^2$ some other gas which is neither air nor oxygen, together with the liquid fuel, it will still be necessary for the said float tanks to contain oxygen or air required for the combustion of the said fuel. In such a case a third tank would be arranged at the side of the liquid fuel container, of a construction similar to that of the gas fuel tank $c^3$ of Figure 3, previously filled with oxygen or air, so that on opening the corresponding valves, the burners $p''$ $p''$ would be fed both with liquid fuel and with oxygen or air, within a neutral atmosphere. Taking as a concrete case the arrangement shown diagrammatically in Figure 7, in which the same elements as in Figure 6 are marked with the same letters, the said third tank equivalent to $c^1$ and $c^2$, referred to in the preceding paragraph, is replaced by another simpler one $o$ which, on the apparatus reaching the fixed depth, is filled with air or oxygen contained in the tank $n$ $n$ $n$, Figure 5, on the pipe $x^3$ discharging into $d_o$, Figure 7, as soon as the valve $m_o$ is opened by operating the lever $P_o$, the gas will fill the space $A_o$ under the piston $E_o$ causing the latter to rise. As soon as the tank is filled, the valve $m_o$ is closed, and the spring $z$ is actuated by means of a lever (which for the purpose of clearness is not shown in the drawings) on the said piston in the upper part of the tank $o$. Owing to the pressure of the air or oxygen in the space $A_o$ (which is higher than that outside and in the rest of the installation of the system owing to the said adjustable spring $z$) it will be found that as soon as the valves $V_o^1$ and $V_o^2$ open, the burners $p''$ $p''$ will be supplied with oxygen or air through the pipes $t$ $t$ and the flexible pipe $t_o'$. If the air or oxygen in the state of pressure (due to the considerable pressure of the outside water which is existent at great depths in the ocean) should be of greater density than the surrounding water so that the filling of the tank $o$ with the said gas at the said depth could not be effected by gravity or lightness as in the inlet opening $d_o$ is at the bottom part, the same arrangement as in the said Figure 7 could be retained by reversing the positions of the said inlet orifice, closing valve etc. and the spring and piston. In this case, those at the bottom will be at the top, and those at the top will be at the bottom, so that on the valve $m_o$ opening, the corresponding tanks $n$ $n$ $n$ for the air or oxygen, Figure 5, on the platforms for filling and descent being then at the upper part and the corresponding admission opening also at the top, the gas will flow downwards also by gravity. The tanks $n$ $n$ $n$, Figure 5, full of light gas for the float tanks $c^1$ $c^2$ must be at the bottom for filling them in the upward direction.

As regards the motive power for the locomotion or navigation of the apparatus, a system of pedals actuated by hand or by foot by the diver and driving chain or endless track wheels or to some other suitable system for taking off from the bottom or for driving a propeller for navigation between two waters may be used. This arrangement is suitable for apparatus according to the present invention intended for smaller depths, up to a maximum of 500 or 1500 metres, but would not be quite so practical for greater depths such as 8000 to 10,000 metres or more. In fact, an apparatus which for a depth of 1500 metres displaces including the floats, a volume of 3 or 4 cubic metres, for the same capacity of a single diver and for a depth of 10,000 metres, would displace from 25 to 30 cubic metres as a consequence of the corresponding weights of the shell and of the floats. By pedalling it is reasonable to move within practical limits a volume of 3 or 4 cubic metres, but not larger volumes such as 25 or 30 cubic metres as would be required in the case alluded to.

It will be shown that with merely a minimum of trouble, the apparatus can be fitted with a thermal engine suitable for the greater depths and having a very considerable radius of action. Taking an apparatus for 1500 metres depth, using air as the floating gas, the float tanks would have a capacity of 2000 litres of air, which at the said depth would be contained at the pressure of 153 kg. per square centimetre. It is also known—see the aforesaid French specification—that only 1% of the said air would be consumed for raising the apparatus to the surface by means of the heating burners provided as already explained in the foregoing. The moment the said depth is reached, there will be available before its rising to the surface 99% of the said air under pressure, and it will be assumed that for this example petrol is utilized as fuel. Calculation shows that for complete theoretical combustion of the air at the pressure of 153 kg. per square centimetre contained in a tank of 1980 litres, 300 litres of petrole would be required. That is to say, it is perfectly obvious that at the deepest parts of the ocean we shall have available an enormous source of energy or of heat.

Figure 7:
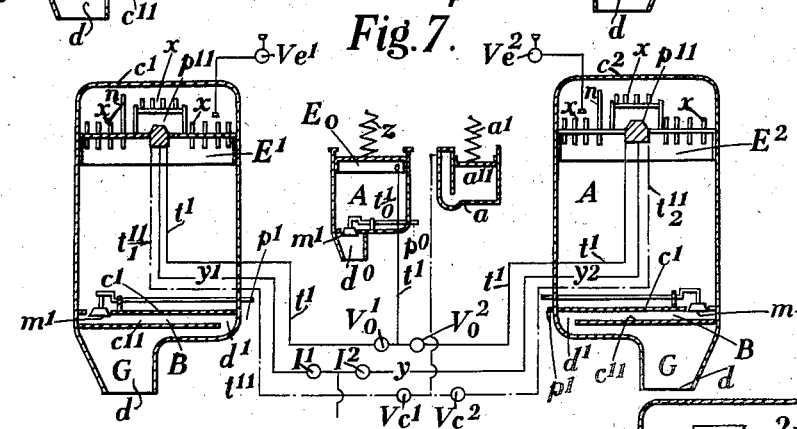
Fig. 7 is a second modification of the apparatus shown in Fig. 3, adapted to use a mixture of liquid and gas as a fuel from tanks A and $a$.

Owing to the construction of our apparatus as explained in this specification, the conversion of the said useful air into burnt gases will not disturb the efficiency of the diving apparatus in itself, since we have seen also that the said gases are discharged at one side of the pistons which separate them from the useful air or gas, see diagrams Figures 3, 6 and 7.

Any thermal engine such as steam engine or air engine, gas or explosion engines such as Diesel etc. can be used for this case, and the corresponding control valves for supplying the air or oxygen and the fuel, or the control parts for the engine will be installed within the strong shell.

Figure 8:
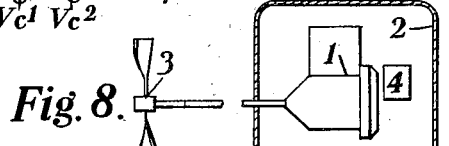
Fig. 8 is an elevational view with parts broken away of a propulsion unit for the device which can be incorporated with any of the modifications described.

The same engine or motive power plant could also be mounted on the outside of the strong shell and protected nevertheless from contact with the outside water by a casing or envelope of a construction similar to that of the float tanks, open at the bottom and admitting a gas at the same pressure as that of the outside water, previously stored in the descent platforms of the apparatus as already explained before, the operator causing the said gas to pass from the shell to the said casing as the apparatus descends to the bottom. Thus, in Figure 8, 1 is the engine mounted in the interior of the shell 2, which drives the propeller 3 through the corresponding clutch mechanism. 4 is an electric starting motor which works as a dynamo supplying electric light for illuminating the bottom of the sea.

In the admission of gas into the engine, it is not absolutely necessary that it should be perfectly free from combustion gases for its good working, since an economy can be effected in admission gases by mixing them with a part of combustion gases.

When it is a question of very great depths such as of 10,000 metres, it is known that the industry does not manufacture a sufficiently strong cable for resisting the pull, in addition to its own weight for a length as great as that mentioned, of an additional weight of 8, 10 or more tons at its end. On the other hand, it is known that at present there are manufactured wires of a very small cross-section, or of two or more very fine cross-sections, known also as "piano chords" which for length of 10,000 or more metres, support in addition to their own weight, weights of 20 to 30 kg. that is to say assuming a descent to a depth of 10,000 metres, an apparatus which would weigh with its descent platforms 20 tons, would require 1,000 wires which in addition to their own weight for 10,000 metres of length would support each 20 kg. at the end. In the following a machine is described which would be installed on board the convoying ship absolutely necessary for descending to great depths, by means of which could be paid out wires or fine cables in any desired number, all at the same time and with the same tension.

Figure 9:
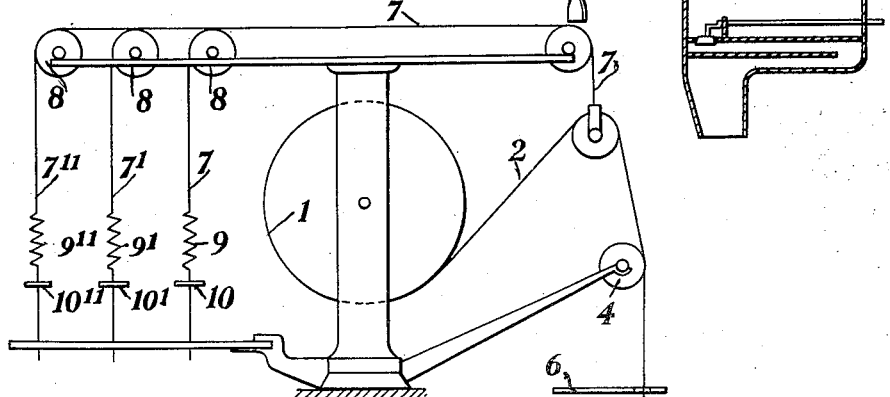
Fig. 9 is a schematic diagram of the hoisting and handling mechanism by which the submarine apparatus is lowered from the convoying, or "mother" ship.

In Figure 9, 1 is the reel or drum on which are wound the wires arranged side by side and separated, or not, by compartments so that they are unwound each on itself, in one and the same cross-section of the reel. The wire 2 passes over an oscillating pulley 3 to another fixed pulley 4 mounted at the outside of the ship and secured to the support 5 from which are suspended the descent platforms on which is installed the diving apparatus as already explained. The main reel or drum 1 is driven by a motor so that on the apparatus rising and on the support 5 striking the lever 6, the motor is automatically stopped and the reel 1 braked. The oscillating pulley 3 suspended by a cable 7 on fixed pulleys 8, 8, makes it possible to ensure a constant tension of the various wires 2 independently of the sudden pitching or rolling of the ship, by regulating the springs 9 by means of the regulating screw 10. The pulleys 8' 8'', cables 7' 7'', springs 9' 9'' and screws 10' 10'' show that each of the cables or wires 2 arranged side by side on the main drum or reel 1, can be arranged not only longitudinally in the same plane but at the same time also in rows, two or more, in order to have more space for the operation of the regulating screws 10 10' 10'' of the adjacent wires 2.

The materials used in the construction of the devices incorporating these improvements, may be varied, and also their shapes and dimensions and generally in any way which does not alter the required essential features.

I claim:

1. An apparatus for submarine exploration and work at great depths comprising in combination: a strong habitable chamber adapted to travel on the sea bed and to be navigated between two waters; a plurality of float tanks associated with said chamber and adapted to be lowered on to the sea bed together with the latter; pistons within said float tanks; a platform upon which said chamber and said tanks are mounted and which comprises containers filled with air or oxygen and containers filled with gas fuel at such a pressure that when the apparatus is on the sea bed, the contents of the containers, when injected into the respective float tanks, displace the water from the interior thereof, thereby reducing the weight of the apparatus to a suitable extent to enable it to leave said platform and to move about on the sea bed; control members in said float tanks; and means associated with said control members and communicating with said chamber for indicating within said chamber the temperature in the interior and exterior and also the level of the water in said float tanks and the level of said pistons.

2. An apparatus for submarine exploration and work at great depths as specified in claim 1, wherein each float tank comprises partitions subdividing it into three compartments, whereby the gas enclosed in the upper compartment is enabled to flow into the intermediate one; a valve and control lever in the passage between the upper and intermediate compartments; the intermediate compartment communicating directly with the lower one which in turn communicates with the exterior, whereby the gases are prevented from escaping when the apparatus lurches or becomes inclined to a considerable extent.

3. An apparatus for submarine exploration and work at great depths as specified in claim 1, wherein the upper compartment of each of the float tanks is divided into two parts by means of a piston of light weight adapted to move up and down within the float chamber, the joints between the said pistons and the said tanks being tight and the said pistons being provided with ribs for facilitating the radiation of heat generated by burners mounted in the upper part of said float tanks.

4. An apparatus for submarine exploration and work at great depths as specified in claim 1, in further combination with means for regulating the quantity of gases to be injected into the float tanks; means for regulating the ignition and extinction of the gas fuel; and means for lightening the apparatus and causing it to rise to the surface.

5. An apparatus for submarine exploration and work at great depths as specified in claim 1, wherein each float tank comprises partitions subdividing it into three intercommunicating compartments located one above the other, whereby the gas enclosed in the upper compartment is enabled to flow into the intermediate one; a valve and control lever in the passage between the upper and intermediate compartments; the intermediate compartment communicating directly with the lower one which in turn communicates with the exterior; a piston of light weight dividing the upper compartment into two parts and adapted to move up and down within the float chamber, the joints between said pistons and said tanks being tight; burners mounted in the upper part of said tanks; and ribs on said piston for facilitating the radiation of heat generated by said burners.

6. An apparatus for submarine exploration and work at great depths, as specified in claim 1, wherein the platform is constructed as a double platform and comprises gas pipes; and means associated with said gas pipes for injecting the contents thereof into the corresponding tanks when the apparatus touches the sea bed thus expelling water from said tanks and lightening the apparatus; propellers on the apparatus; and rudders on the apparatus; whereby the apparatus is enabled to leave the platforms and to move under its own power.

7. An apparatus for submarine exploration and work at great depths, as specified in claim 1, wherein one of the said float tanks is made of smaller capacity than the remaining float tanks and is employed for the accommodation of liquid fuel.

8. An apparatus for submarine exploration and work at great depths, as specified in claim 1, in further combination with: a tank containing air, oxygen or other oxidizing agent, whereby the use of non-oxidizing gases in the other tanks is avoided.

9. An apparatus for submarine exploration and work at great depths, as specified in claim 1, in further combination with motors preferably operated by the employment of a part of the combustible and oxidizing contents of the said containers; and propulsive means, such as a propeller, actuated by said motors, whereby the apparatus is enabled to move in the required manner.

10. An apparatus for submarine exploration and work at great depths, as specified in claim 1, in further combination with: means for lowering the apparatus comprising cables; oscillating pulleys associated with said cables; springs for regulating the tension of said cables; and a mooring bar to which all said cables converge and which supports the weight of the apparatus to be lowered.

OSCAR FERRER MUNGUET.